No. 616,936. Patented Jan. 3, 1899.
J. S. KIDD.
SPROCKET WHEEL AND CHAIN.
(Application filed Feb. 21, 1898.)
(No Model.)
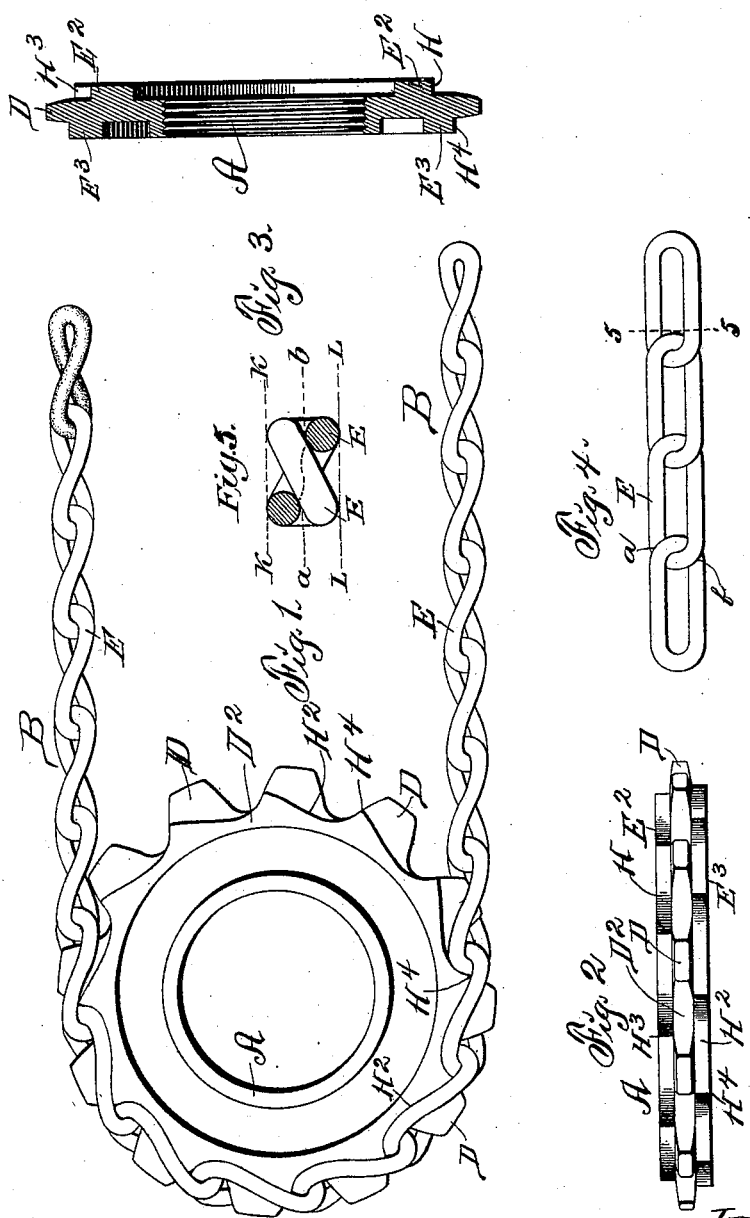

UNITED STATES PATENT OFFICE.

JOHN S. KIDD, OF DES MOINES, IOWA.

SPROCKET WHEEL AND CHAIN.

SPECIFICATION forming part of Letters Patent No. 616,936, dated January 3, 1899.

Application filed February 21, 1898. Serial No. 671,156. (No model.)

*To all whom it may concern:*

Be it known that I, JOHN S. KIDD, a citizen of the United States of America, and a resident of Des Moines, county of Polk, State of Iowa, have invented certain new and useful Improvements in Sprocket Wheels and Chains, of which the following is a specification.

My invention relates to sprocket wheels and chains, and is an improvement upon the forms of both and their combination with each other.

Ordinary sprocket-chains either are complicated, expensive, weak in proportion to weight, or not durable, will wear and stretch, have small bearing-surfaces between the links, will hold dirt and grit, are hard to clean, and produce great friction even when lubricated. Ordinary sprocket-wheels wear and cut by the action of the chain upon the wheel and by the grit which is adhered by the lubricants.

My object is to produce a chain and wheel that may be used in conjunction without lubrication and in such use effect a reduction of friction, demonstrate greater strength for a given weight and dimension of chain, and be producible at less cost than the ordinary structures.

Primarily my invention consists in the combination of a toothed sprocket-wheel with a chain composed of a series of twisted links, which links are each formed of a single loop and so twisted and shaped as to present an opening for the reception of successive teeth on the wheel and have rolling contact with each other and with the sprockets of the wheel.

My invention also encompasses the production of a chain composed of twisted links looped together, associated or intersuspended one upon the other in the common and well-known manner, and so constructed that in use, with the torsion entirely or substantially taken up in one direction, said chain will ride without twisting or turning and present openings in the links to pass over and engage the sprockets of the wheel with which it is used.

My invention further comprises the production of a sprocket-wheel with sprockets on its periphery fitted to enter and engage twisted links of a chain and formed or provided with adjacent seats or beds to receive and retain against lateral oscillation the bodies of the links as the chain travels over the wheel.

My invention consists, further, in the construction, arrangement, and combination of elements hereinafter set forth, pointed out in my claims, and illustrated by the accompanying drawings, in which—

Figure 1 is a side elevation of a sprocket wheel and chain associated in the manner required for practical use. Fig. 2 is an edge elevation of the sprocket-wheel. Fig. 3 is a cross-section of the sprocket-wheel. Fig. 4 is a plan of a portion of the sprocket-chain. Fig. 5 is a cross-section of my chain on the indicated line 5 5 of Fig. 4 on an enlarged scale and illustrated with dotted lines to indicate certain planes and a line of contact to which reference is made in the specific description.

In the construction of the device as shown the letter A designates a sprocket-wheel adapted for conjunctive use with a twisted-link chain B, also of peculiar construction.

The teeth D of the sprocket-wheel A may be of usual form and are so arranged radially upon the periphery of the rim $D^2$ of the wheel as to be separated by equal distances.

In order that the periphery of the sprocket-wheel may conform to the shape of the twisted links E of the chain B, said periphery is of such width as to project or extend laterally from the line of the base of the teeth on either side thereof, and the projecting portions or flanges (designated as $E^2$ and $E^3$) are provided with recesses, depressions, or seats H and $H^2$. The depressions or seats on either side of the teeth D are relatively arranged in such manner as to form shoulders $H^3$ and $H^4$ on either side of the teeth, the shoulders $H^3$ on one side of the teeth being located at a point in advance of the shoulders $H^4$ on the opposite side of the teeth. The formation of the flanges and the seats and shoulders therein has the effect of broadening the bases of the teeth to provide seats for engagement with the twisted links of the sprocket-chain. By this means or by reason of this construction the sprocket-wheel is adapted for use conjunctively or in combination with a twist-link chain.

I have provided a chain having twisted links with openings for the sprockets of the wheel and have so constructed said chain that it will travel evenly and smoothly about the wheel and present the openings of successive links, so that the sprockets of the wheel may readily enter said openings. I construct each link of the chain with an individual twist or shape approximating to such a form that any two adjacent links cross each other at oblique angles and mutually contact on a line (dotted in Fig. 5) on the inner or axial surfaces of the ends thereof to provide a convex bearing for each other. Thus the inner surface of the end of one link rolls upon the contacting surface of the other link, reducing friction due to the chain flexure to a minimum. Any two adjacent links of the chain cross each other at the ends or extremities of the line of contact therebetween, thereby seating or fulcruming said adjacent interengaging links upon each other, whereby in the use of a complete chain of such links on one or more sprocket-wheels the torsional movement of any two adjacent interengaging links relative to each other is limited and inappreciable in one direction and approximately unlimited in the other direction, thus permitting the chain to be crossed, the line of contact between the interengaging ends of adjacent links extending continuously between two points on opposite sides thereof, (designated as $a\,b$.) Thus, Fig. 5, the planes K K L L, tangential to the extreme upper and lower points of adjacent links and the plane determined by the extremities of the lines of contact $a\,b$ are parallel when the chain travels to, upon, and away from the wheel. The transverse lines of contact between interengaging ends of the links of the chain are established, as described, whenever the chain is running approximately taut or is in its normal operative position in passing over a sprocket-wheel.

In operation flexing relative to each other to and away from a wheel and because of the fulcruming of adjacent links upon each other at the ends of the line of contact therebetween said links roll upon each other as contradistinguished from a sliding contact commonly found resulting from flexure of two links crossing each other at right angles. The links are also formed with rounded outer surfaces on their ends, arranged to engage and roll upon and away from the sprocket-teeth in approaching or leaving the wheel as contradistinguished from a sliding contact between the links and teeth commonly found in the seating or unseating of chains relative to a sprocket-wheel. Because of the rolling contact of the teeth and links, assisted by the absence of torsional vibration in one direction, the friction therebetween is minimized, resulting in longer life and greater ease in the operation thereof.

I claim as my invention—

1. In an apparatus for transmitting power, a chain composed of like links twisted to such angles that the planes tangential to the extreme upper and lower points of said links and the plane determined by the extremities of the common lines of contact of adjacent links shall be parallel, in combination with a sprocket-wheel, having teeth arranged on its periphery and so shaped as to successively engage within the successive links of the chain, the periphery of the wheel between the teeth being concaved to form seats for the engaging end portions of the chain-links.

2. A sprocket-wheel for conjunctive use with a twisted-link chain, having teeth on its periphery, to enter the openings in the links of said chain, and having a periphery with depressions approximately to conform to the shape of said links and flanges on either side of said periphery and shoulders on said flanges on either side of said teeth.

3. A sprocket-wheel for conjunctive use with a twisted-link chain, having a periphery depressed at points to conform to the shape of the twisted links of the chain and shoulders at intervals on said periphery on each side of the sprocket-wheel, the shoulders on one side of the teeth being in advance of the shoulders on the other side of the teeth.

4. The combination with a sprocket-wheel of a chain whose links are twisted relative to their longest diameters to such an angle that the planes tangential to the extreme upper and lower points of said links and the plane determined by the extremities of the common lines of contact of adjacent links shall be parallel.

5. The combination with a sprocket-wheel of a chain comprising a series of links, the ends of each link being at such angle to each other that when the extremities of the contacting lines of adjacent links, on opposite sides of the longitudinal axis of the links, are in the same plane, the chain will be flexible in one direction and inflexible in the other direction torsionally.

6. In an apparatus for transmitting power a sprocket-wheel, sprocket-teeth on said wheel, which teeth are arranged in a row on the central portion of the face of the wheel and approximately equidistant from the sides of said wheel, in combination with a chain composed of a series of twisted links, which links are each formed of a single loop and so twisted and shaped as to present an opening for the reception of successive teeth on the wheel.

7. In an apparatus for transmitting power, a sprocket-wheel and teeth on said wheel, which teeth are located in a row approximately at the center of the face of the wheel and equidistant from the sides of said wheel, the said wheel having its perimeter formed with depressions, in combination with a chain composed of a series of twisted links, which links are each formed of a single loop and so twisted and shaped as to present an opening for the reception of successive teeth on the wheel, the outer faces of the links resting at times within the depressions of the wheel.

8. A sprocket-wheel provided with teeth, the bases of which teeth are broadened in opposite directions at opposite ends to form shoulders for impact with the ends of chain-links, in combination with a chain shaped for seating against said shoulders.

Signed by me, at Des Moines, Iowa, this 17th day of February, 1898.

JOHN S. KIDD.

Witnesses:
S. C. SWEET,
THOMAS G. ORWIG.